United States Patent Office 2,899,445
Patented Aug. 11, 1959

2,899,445

2-(2',4'-DICHLOROPHENOXY)-3-CHLORODIOXANE

Irving Rosen, Painesville, Ohio, assignor to Diamond Alkali Company, Cleveland, Ohio, a corporation of Delaware No Drawing. Application August 6, 1956
Serial No. 602,430

1 Claim. (Cl. 260—340.6)

This invention relates to new chemical compounds, compositions containing such compounds, and to methods for their use.

The novel compounds of this invention are derivatives of 1,4-dioxane and are generally represented by the following structural formula:

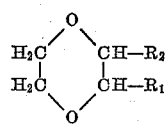

In the formula, $R_1$ and $R_2$ are selected from the group consisting of SCN, and a combination of halogen and aryloxy, where $R_1$ is halogen and $R_2$ is aryloxy, —$OR_3Y$ where $R_3$ is an alkyl and Y is selected from the group consisting of aryloxy, alkylcarboxy, amino and polysulfide groups.

The novel compounds of this invention are prepared by a process comprising the step of reacting a 2,3-dihalodioxane with compounds containing the groups noted above. The reaction is carried out in an organic solvent medium of which methyl ethyl ketone, toluene and the like are representative, or directly as will be described more fully hereinafter. The compound 2,3-dihalodioxane, of which 2,3-dichlorodioxane is representative, is well known in the art and for this reason methods for its preparation need not be discussed here.

Exemplary of the compounds derived from 1,4-dioxane where $R_1$ is halogen and $R_2$ is aryloxy are phenols, halogenated phenols or alkali metal salts thereof. In the case of the dihalogenated phenols, 2-(2',4'-dihalophenoxy)-3-halodioxane is obtained. Where $R_1$ and $R_2$ are selected from SCN, the compound 2,3-dithiocyanodioxane is the result. Where $R_1$ and $R_2$ are selected from the group —$OR_3Y$, $R_3$ being an alkyl group and Y being selected from aryloxy, alkylcarboxy, amino and polysulfide groups, the following compounds are exemplary: 2,3-bis(2-phenoxyethoxy) dioxane; 2,3-bis(ethyl-2-oxypropionate) dioxane; a polymer with 1,6-diamino hexane; and a polymer with sodium polysulfide.

In order that this invention may be more fully understood, reference is made to the following specific examples.

Derivatives of 1,5-dioxane where $R_1$ is halogen and $R_2$ is aryloxy:

Example 1

In this example, an unsymmetrical derivative of 2,3-dichlorodioxane, i.e., 2-(2',4'-dichlorophenoxy)-3-chlorodioxane is prepared by dissolving 3.0 grams (0.019 mol) of 2,3-dichlorodioxane in 50 ml. of toluene and then adding 6.5 grams (0.040 mol) of 2,4-dichlorophenol. The mixture is refluxed for about 40 hours at the end of which time the toluene is evaporated and a white solid precipitate is obtained. The solid is dried, recrystallized from n-hexane and 1.3 grams of purified product melting at 128.5–130.5° C. is obtained. Evaporation of the solvent yields an additional 0.2 gram of product. The total yield is 27.8%. Calculated for $C_{10}H_9Cl_3O_3$: 42.35% C, 3.20% H, 37.6% Cl; found: 42.79% C, 3.13% H, 36.2% Cl.

Derivatives of 1,4-dioxane where $R_1$ and $R_2$ are selected from the SCN group:

Example II

The compound 2,3-dithiocyanodioxane is prepared by dissolving 18.0 grams (0.222 mol) of NaSCN in 180 ml. of methyl ethyl ketone in a flask equipped with a stirrer and reflux condenser. To this solution there is added 15.0 grams (0.096 mol) of 2,3-dichlorodioxane in 40 ml. of methyl ethyl ketone. The mixture is refluxed with stirring for about 50 minutes, allowed to cool, and sodium chloride filtered therefrom. The methyl ethyl ketone is then evaporated to about ¼ its original volume and the mixture is allowed to cool and filtered. The solvent is then evaporated and the product washed with n-hexane and then with water. The solid precipitate is then dissolved in acetone and ether is added to precipitate the product. After this the product is washed with ether and analyzed. Calculated for $C_6H_6N_2O_2S_2$: 35.7% C, 2.97% H, 13.85% N; found: 34.97% C, 3.41% H, 14.38% N. The product decomposes at 134° C.

Derivatives of 1,4-dioxane where $R_1$ and $R_2$ are selected from the group —$OR_3Y$ where $R_3$ is an alkyl and Y is selected from the aryloxy, alkylcarboxy, amino and polysulfide groups:

Example III

The compound 2,3-bis(2-phenoxyethoxy) dioxane is prepared by adding 13.3 grams (0.085 mol) of 2,3-dichlorodioxane to 27.0 grams (0.196 mol) of phenyl Cellosolve in a flask. The mixture is heated at from 95° to 125° C. for about 1 hour and 15 minutes or until there is little evolution of hydrogen chloride. To the reaction mixture there is then added about 25 ml. of xylene and then refluxed at a temperature of from 140–145° C. for about 5 hours or until hydrogen chloride evolution ceases. The xylene is then boiled and the mixture is distilled under vacuum. The following fractions and analyses are obtained.

| Fraction | Grams | Distillation Temperature, ° C. | Pressure, mm. Hg | Analysis | |
|---|---|---|---|---|---|
| | | | | Calcd. for ($C_{20}H_{24}O_6$) | Found |
| I | 11.0 | 238–243 | 1.4 | 66.7% C<br>6.72% H | 66.6% C<br>6.47% H |
| II | 3.5 | 249–255 | 2.2 | 66.7% C<br>6.72% H | 66.2% C<br>6.70% H |

Fraction I crystallized on standing and after recrystallization from ether melted at 78–79° C. The product is obtained in 47.3% yield.

Example IV

In the preparation of the novel polymer from 1,6-diamino hexane and 2,3-bis(2-chloroethoxy) dioxane, the latter reactant can be prepared by adding 2,3-dichlorodioxane to ethylene chlorohydrin, refluxing for about 1½ hours and vacuum distilling the product. The polymer is then prepared by adding 10.0 grams (0.041 mol) of 2,3-bis(2-chloroethoxy) dioxane to 8.6 grams of 72% (equivalent to 6.2 grams, 0.053 mol, dry) hexamethylene diamine and 1.5 grams of water. The mixture is heated at reflux for 10 minutes and then 4.0 grams (0.10 mol) of sodium hydroxide pellets are slowly added and the mixture stirred and refluxed for about 1½ hours; a thick viscous liquid is obtained. The viscous liquid is then added to 1 liter of water, stirred and permitted to settle. The product is filtered and dried. About 2 grams of a rubbery product is obtained which swells in water. The polymer has the structural formula

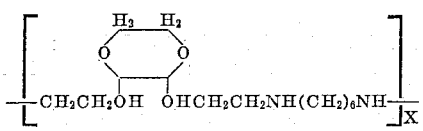

and a molecular weight of at least 1000.

*Example V*

The novel polymer with sodium polysulfide is prepared by first adding 30.0 grams (0.125 mol) of $Na_2S \cdot 9H_2O$ to 5.0 grams (0.125 mol) of sodium hydroxide in 120 ml. of water, heating the mixture to boiling, adding 15.0 grams (0.469 mol) of powdered S, boiling for 10 minutes, filtering the mixture into a flask containing 90 ml. of water and adding 0.5 grams of an anionic wetting agent in 10 ml. of water. The composition of the sodium polysulfide at this step corresponds to 0.188 mol of $Na_2S_{3.2}$. To this mixture, at 80° C., there is then added 11.0 grams (0.045 mol) of 2,3-bis(2-chloroethoxy) dioxane, kept at that temperature with stirring for about 25 minutes and then allowed to cool. About 5 ml. of concentrated ammonium hydroxide is added and the mixture set aside. After this the mother liquor is decanted and the solid is washed with 195 ml. of water containing 5 ml. of concentrated ammonium hydroxide. The mixture is then acidified with about 30% acetic acid followed by washing with water. A polymer weighing 9.0 grams and having the following structural formula is obtained:

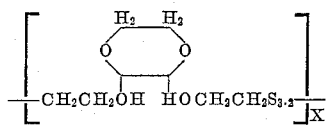

The polymeric material is sticky, tacky, very viscous, is insoluble in acetone, slightly soluble in benzene and has a molecular weight of at least 1000.

*Example VI*

The compound 2,3-bis(ethyl-2-oxypropionate) dioxane is prepared by dissolving 15.7 grams (0.10 mol) of 2,3-dichlorodioxane in 35.4 grams of ethyl lactate. The solution is heated at 110° C. until no more hydrogen chloride is evolved. The unreacted ethyl lactate is then stripped off under reduced pressure and the solution is vacuum distilled. A fraction weighing 7.5 grams (23.4% yield) and distilling at 120–123° C. at 0.05–0.06 mm. Hg is obtained and analyzed. Calculated for $C_{14}H_{24}O_8$: 52.5% C, 7.56% H; found: 51.61% C, 7.58% H.

By the procedures described above in the specific examples, the novel chemical compounds of this invention are readily prepared. It is recognized, of course, that the methods described for such preparation are not intended as limitations since modifications can be made in the procedure to arrive at the novel composition of matter of this invention.

The novel chemical compounds of this invention find many applications either per se or in combination with other compositions of matter. Thus, for example, the unsymmetrical aryloxy, alkyl and alkylcarboxy derivatives of 1,4-dioxane, i.e., 2-(2',4'-dichlorophenoxy)-3-chlorodioxane and 2,3-bis(2-phenoxyethoxy) dioxane, as well as 2,3-dithiocyanodioxane exhibit biological activity and can be used as fungicides. In the fungicidal test the chemicals are suspended or dissolved in distilled water at an initial concentration of 1000 parts per million for the spore germination test on slides and 2000 parts per million or lower for the tomato foliage disease test by first adding a solvent, usually acetone at 5% and an emulsifier such as Triton X–155 (alkyl aryl polyether alcohol) at about 0.01% concentration. In the spore germination test on glass slides the compound at 1000 parts per million is tested for its ability to inhibit germination of spores from 7 to 10 day old cultures of *Alternaria oleracea* and *Sclerotinia fructicola*. In the tomato foliage test, the plants (var. Bonny Best) are sprayed with 100 ml. of the test formulation at 2000, 400 and 80 parts per million at 40 lbs. air pressure. The chemicals can be compounded or used with other ingredients as sprays, extenders and the like in fungicidal, insecticidal and the like compositions. The 2,3-dithiocyanodioxane, in addition to exhibiting biological activity through the —SCN group is also useful as a chemical intermediate for the preparation of disulfides, mercaptides or sulfonic acids and the like. The polymeric derivatives of 2,3-bis(2-chloroethoxy) dioxane, i.e., the amino and polysulfide polymers, can be used as rubber fillers and especially the thiokol type polysulfide polymer due to its special solvent resistant type properties. In addition, the compounds 2,3-bis(2-phenoxyethoxy) dioxane and 2,3-bis-(ethyl-2-oxypropionate) dioxane can be used as plasticizers; the latter compound also being useful as a diester for condensation type polymerizations.

Having thus described the novel chemical compositions of this invention with regard to their properties, preparation and uses, it is recognized that various modifications will be apparent to those skilled in the art and it is intended to cover all modifications that fall within the spirit of the invention and scope of the appended claim.

What is claimed is:

2-(2',4'-dichlorophenoxy)-3-chlorodioxane.

References Cited in the file of this patent

UNITED STATES PATENTS

| | | |
|---|---|---|
| 2,164,355 | Slagh | July 4, 1939 |
| 2,164,356 | Slagh | July 4, 1939 |
| 2,195,386 | Britton et al. | Mar. 26, 1940 |
| 2,234,861 | Dickey et al. | Mar. 11, 1941 |
| 2,286,824 | McNally et al. | June 16, 1942 |
| 2,385,661 | Vaala | Sept. 25, 1945 |
| 2,397,602 | Gresham | Apr. 2, 1946 |